United States Patent [19]

Gamblin

[11] Patent Number: 4,523,202

[45] Date of Patent: Jun. 11, 1985

[54] RANDOM DROPLET LIQUID JET APPARATUS AND PROCESS

[75] Inventor: Rodger L. Gamblin, Dayton, Ohio

[73] Assignee: Burlington Industries, Inc., Greensboro, N.C.

[21] Appl. No.: 428,490

[22] PCT Filed: Feb. 3, 1982

[86] PCT No.: PCT/US82/00140

§ 371 Date: Sep. 28, 1982

§ 102(e) Date: Sep. 28, 1982

[87] PCT Pub. No.: WO82/02767

PCT Pub. Date: Aug. 19, 1982

Related U.S. Application Data

[63] Continuation-in-part of Ser. No. 231,326, Feb. 4, 1981, abandoned.

[51] Int. Cl.³ .............................................. G01D 15/18

[52] U.S. Cl. .......................................... 346/75; 239/4; 239/102; 331/78; 346/1.1

[58] Field of Search ..................... 346/75, 1.1; 331/78; 239/4, 102

[56] References Cited

U.S. PATENT DOCUMENTS

| | | | |
|---|---|---|---|
| 2,753,453 | 7/1956 | Michels | 331/78 X |
| 2,773,185 | 12/1956 | Fulton | 331/78 |
| 3,298,030 | 1/1967 | Lewis | 346/75 |
| 3,373,437 | 3/1968 | Sweet et al. | 346/75 |
| 3,416,153 | 12/1968 | Hertz et al. | 346/75 |
| 3,484,793 | 12/1969 | Weigl | 346/75 |
| 3,560,988 | 2/1971 | Krick | 346/75 X |
| 3,579,721 | 5/1971 | Kaltenbach | 425/3 |
| 3,586,907 | 6/1971 | Beam | 346/75 X |
| 3,596,275 | 7/1971 | Sweet | 346/75 X |
| 3,656,171 | 4/1972 | Robertson | 346/75 X |
| 3,673,601 | 6/1972 | Hertz | 346/75 |
| 3,675,148 | 7/1972 | Edwards | 331/78 |
| 3,798,656 | 3/1974 | Lowy et al. | 346/75 X |
| 3,882,508 | 5/1975 | Stoneburner | 346/75 |
| 3,891,121 | 6/1975 | Stoneburner | 346/75 X |
| 3,898,671 | 5/1975 | Berry et al. | 346/75 |
| 3,916,421 | 10/1975 | Hertz | 346/75 |
| 3,956,756 | 5/1976 | Paton | 346/75 |
| 4,005,435 | 1/1977 | Lindquist et al. | 346/75 X |
| 4,018,383 | 4/1977 | Paton | 346/75 X |
| 4,074,277 | 2/1978 | Lane | 346/75 |
| 4,095,232 | 6/1978 | Cha | 346/75 |
| 4,223,320 | 9/1980 | Paranupe | 346/75 |

FOREIGN PATENT DOCUMENTS

| | | |
|---|---|---|
| 2154472 | of 0000 | Fed. Rep. of Germany . |
| 1095689 | of 0000 | United Kingdom . |

OTHER PUBLICATIONS

"Spray Printing Process for Fabrics" by Dr. J. Eibl Leverkusen, Chemiefasern/Textil-Industrie, Jul. 1977, pp. 636–645, English Translation, pp. E113–E115.

"Ink-Jet Printing" by Larry Kuhn et al., Scientific American, Apr. 1979, pp. 162–178.

"Ink-Jet Printing—A New Possibility in Textile Printing", by Rudolf Meyer et al., Melliand Textilberichte [English Edition], Feb.-Mar. 1977, pp. 162–165, 255–261.

"Ink Jet Printing" by Fred J. Kamphoefner, IEEE Transactions on Electron Devices, vol. ED-19, No. 4, Apr. 1972, pp. 584–593.

"DIJIT Ink Jet Printing" by Peter L. Duffield, TAGA Proceedings for 1974, pp. 116–132.

"Jet Set: by Mike Keeling Appearing in British Journal Identifies as Erit PRTR, vol. 93, No. 6 for Jun. 1980, apparently at pp. 21 et seq.

*Primary Examiner*—Joseph W. Hartary
*Attorney, Agent, or Firm*—Cushman, Darby & Cushman

[57] ABSTRACT

Liquid jet printer apparatus and method includes the purposeful addition of random acoustic vibrations to the system so as to reduce adverse printing effects otherwise caused by standing acoustic waves along the length of an orifice array. As a result, a longer cross-machine dimension for the printer orifice array is made practical as may be required, for example, for some textile applications.

12 Claims, 4 Drawing Figures

RANDOM DROPLET LIQUID JET APPARATUS AND PROCESS

RELATED CASES

This application is a continuation-in-part of my application Ser. No. 231,326 (now abandoned) filed Feb. 4, 1981, through my International application No. PCT/US 82/00140, filed Feb. 3, 1982 which designated the United States.

FIELD OF THE INVENTION

This invention relates to the field of non-contact fluid marking devices which are commonly known as "ink jet" devices.

THE PRIOR ART

Ink jet devices are shown generally in U.S. Pat. No. 3,373,437, issued Mar. 12, 1968, to Sweet & Cumming: No. 3,560,988, issued Feb. 2, 1971 to Krick; No. 3,579,721, issued May 25, 1971 to Kaltenbach; and No. 3,596,275, to Sweet, issued July 27, 1971. In all of those devices, jets (very narrow streams) are created by forcing a supply of recording fluid or ink from a manifold through a series of fine orifices or nozzles. The chamber which contains the ink or the orifices by which the jets are formed are vibrated or "stimulated" so that the jets break up into droplets of uniform size and regular spacing. Each stream of drops is formed in proximity to an associated selective charging electrode which establishes electrical charges on the drops as they are formed. The flight of the drops to a receiving substrate is controlled by interaction with an electrostatic deflection field through which the drops pass, which selectively deflects them in a trajectory toward the substrate, or to an ink collection and recirculation apparatus (commonly called a "gutter") which prevents them from contacting the substrate.

While it has been known that a fine liquid jet will break into discrete droplets under its inherent thermal and acoustic motion even in the absence of any external perturbations, it has heretofore generally been believed that specifically calibrated separate perturbation at or near the natural frequency of drop formation was a practical necessity to produce droplets that are regularly spaced, sized, and timed across the orifice array to permit proper use of the apparatus. Printing with charged drops requires relatively precise control of the droplet paths to the ultimate positions on the receiving substrate, and drop size, spacing, and charge level have generally been regarded as critical factors. Thus, Sweet requires perturbation means for assuring that droplets in the stream are spaced at regular intervals and are uniform in size.

As noted in Sweet, the stream has a natural tendency, due at least in part to the surface tension of the fluid, to break up into a succession of droplets. However, as is easily observed in a jet of water squirted through a garden hose nozzle, the droplets are ordinarily not uniform as to dimension or frequency. In order to assure that the droplets will be substantially uniform in dimension and frequency, Sweet provides means for introducing what he refers to as "regularly spaced varicosities" in the stream. These varicosities create undulations in the cross-sectional dimension of the jet stream issuing from the nozzle. They are made to occur at or near the natural frequency of formation of the droplets. As in Sweet, this frequency may be typically on the order of 120,000 cycles per second.

A wide variety of varicosity inducing means are now known in the art. For example, Krick utilizes a supersonic vibrator in the piping through which ink is fed from the source to the apparatus; and in Kaltenbach, the ink is ejected through orifices formed in a perforated plate which is vibrated continuously at a resonant frequency.

Since the advent of the Sweet approach, non-contact marking devices utilizing fluid droplet streams have become commercially developed. However, so far as is known to me, it has been a characteristic of ink jet devices that all of them utilize some type of varicosity inducing means or "stimulator" to induce regular vibrations into the stream to provide regularity and uniformity of the droplets.

As noted in Stoneburner U.S. Pat. No. 3,882,508, issued May 6, 1975, proper stimulation has been one of the most difficult problems in the operation of jet drop recorders. For high quality recording it has been necessary that all jets be stimulated at the same frequency and with very nearly the same power to cause break-up of all the streams into uniformly sized and regularly spaced drops.

Furthermore, it is necessary that drop generation not be accompanied by generation of "satellite drops", and that the break-up of the streams into drops occur at a predetermined location in proximity to the charging electrode, both of which are dependent on the power of delivery at each jet. Stoneburner shows means for generating a traveling wave along the length of an ink supply manifold of which an orifice plate forms one side. The wave guide so formed is tapered or progressively decreased in width along its length, to counteract and reduce the natural tendency toward attenuation of the drop stimulating bending waves as they travel down the length of the orifice plate.

BRIEF DESCRIPTION OF THE PRESENT INVENTION

In practice, there is often an undesirable interaction between the stimulator and the structure of the ink delivery system. This adverse effect may show up as a tendency for the overall system to achieve non-uniform stimulation across the orifice array due to reflected and interfering waves (as referred to in Stoneburner, just discussed), such that certain orifices do not receive appropriate stimulation while others have too much. The system thus has "cusps" or null points that are reflected as degradations in the quality of droplet deposition. Furthermore, with these variations in power, satellite or very small droplets tend to form in between each of the larger droplets and cause difficulties within the system in that these fine droplets tend to escape and be dispersed into the surrounding area or beyond the acceptable target area limits. Satellite droplet formation is a sensitive function of the properties of the ink or treating liquid being used so that the problem of stimulation is further complicated.

Another and major limiting factor of the known perturbed ink jet systems resulting from the stimulator is that the traveling waves generated by the external or artificial perturbation means substantially limit the length of those devices. From a practical standpoint, such known devices are limited to cross-machine orifice plate lengths no greater than 10.5 inches (26.67 cm) where there are 120 jets to the inch and the artificial perturbation means is operating at 48 kilocycles. At higher frequencies the possible length of the orifice plates is reduced, while at lower frequencies the length might be lengthened.

There are numerous disadvantages associated with such orifice plate limitations. The primary disadvantage is encountered in trying to build a perturbed orifice system suitable for treatment of continuous length broad width goods, for example including those in the textile field, wallpaper, paper or other continuous length broad width goods or in continuously or intermittently fed forms of other wide substrates or materials, where any such goods, substrates or materials range in width from about one foot to about several yards. Experience shows that it is extremely difficult and, practically speaking, almost impossible to combine two or more of the limited length perturbed orifice plates across the needed distance in a manner that will permit the uniform continuous treating of such goods or materials sufficiently to mask the separation between the perturbed orifice plate sections, and/or to mask the effect of their mutually different operational patterns. It becomes increasingly difficult to obtain a satisfactory result as the number of such short length perturbed orifice plates is increased to span increasing widths of goods to be treated.

With the present invention, however, where no artificial or external perturbation is being used (unless random perturbations are used as in the FIG. 3, 4 embodiments), there is virtually no limitation on the length of the orifice plate or the extent over which such orifices can be made available for use across the width of a wide or narrow substrate or receiving medium. Thus, textile paper or other substrates having widths varying from a few feet to many yards can be treated as they are moved or otherwise indexed beneath a single, machine-wide orifice structure. A plurality of such machine-wide orifices can of course be operated in tandem or in some predetermined manner or sequence to accomplish any desired result.

It has been found that although droplet break-up in an unperturbed (unless random perturbations are used as in the FIG. 3, 4 embodiments), continuous jet system is a random process, the distribution of random droplet sizes and spacings is nevertheless quite narrow. I have also found that at smaller orifice sizes and higher fluid pressures, the variations among randomly generated droplets can be made sufficiently narrow so that the resulting random droplet streams become useful, for example, in applying color patterns or any type of treating agent or agents to textiles or for applying indicia or treatments to a variety of other surfaces employing a variety of liquids.

This "narrow random distribution" effect is utilized according to a preferred form of the invention in apparatus having; a source of treating liquid which is to be applied under higher pressure than is normally used for equivalent accuracy of droplet placement; a series of jet orifices of smaller diameter than usual, for equivalent droplet placement accuracy, through which orifices the treating liquid or coloring medium is forced as fine streams that break randomly into discrete droplets; electrode means for imparting electrostatic charges to the drops as they form; and deflection means for directing the paths of selected droplets in the streams toward a receiving substrate or toward a gutter or other collecting means. Further, the charging electrode is more extensive than with a stimulated system since the break-off point may vary more in both space and time.

Neither the apparatus nor the process has perturbation means that would impart regular cyclical vibrations or cause the liquid being applied to break into droplets more uniform than their unperturbed, random size distribution (however random pertubations can be used as in the FIGS. 3, 4 embodiments).

To achieve a given accuracy of droplet placement, or "droplet misregistration value," an unperturbed system with the same flow rate requires a different orifice size and pressure from those of a perturbed system. The orifice size must be smaller than would be used to achieve the same accuracy in a conventional perturbed system, typically no more than about 70% the orifice diameter of a perturbed system having the same accurately of droplet placement or droplet misregistration value. The liquid head pressure is also, or alternatively, substantially higher, preferably at least about four times that of a perturbed system with corresponding accuracy. Further, it is desirable that the charging voltage be higher, by a factor of at least about 1.5 times.

For purposes of this specification and claims, the term "droplet misregistration value" is defined as the offset distance or variation from a straight line, measured in a direction perpendicular (ie. the "cross-machine" direction) to the direction of travel of the substrate, of a mark on the substrate when all jets in an array perpendicular to the direction of motion of the substrate are switched at the same time from being caught by the gutter to being delivered to the substrate.

The perturbations that cause drop break-off in unstimulated jets generally arise from the environment in which the system is found. Generally these fluctuations are produced by the normal sound and acoustic motion that are inherently present in the fluid. However, in some "noisy" environments, unwanted external perturbations, for example, factory whistles, vibrations from gears and other machine movements, and even sound vibrations from human voices, can have an overpowering influence and cause a change in the mean break-off point of the jets in an unstimulated system. In a modified embodiment of this invention, the system can be irregularly stimulated, as by a noise source which generates random vibrations. I believe this embodiment can be found useful where the apparatus is to be used in a noisy area. In such an environment, the application of the irregular noise vibration will surprisingly produce more regular results from jet to jet than application of regular cyclical vibrations.

Other objects, features, and characteristics of the present invention as well as the process, and operation and functions of the related elements and the combination of parts, and the economies of manufacture, will become more apparent from the following description and the appended claims with reference to the accompanying drawings, all of which form a part of this specification, wherein like reference numerals designate corresponding parts in the various figures.

DETAILED DESCRIPTION OF THE PREFERRED EMBODIMENT OF THE PRESENT INVENTION

While this invention may be similar to previously known ink jet recording apparatus in that similar results can be achieved, the basic operating principle of the present invention differs radically from such known ink jet recording systems.

Figure 1:
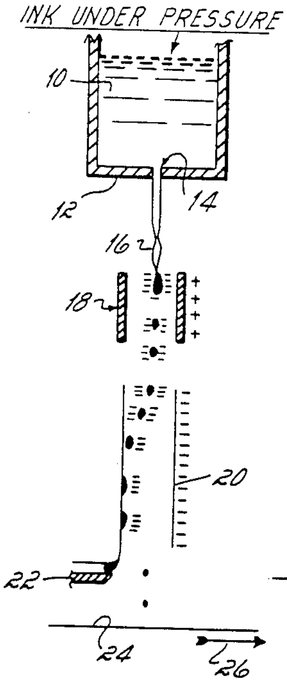
FIG. 1 is a diagrammatic cross-sectional illustration of a binary continuous fluid or liquid jet apparatus in accordance with the invention.
Figure 2:
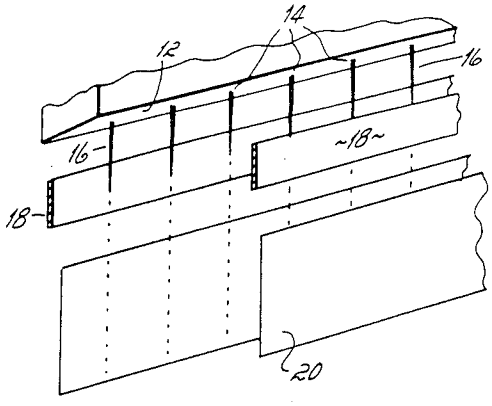
FIG. 2 is a diagrammatic perspective illustration showing the droplet charging means and the droplet deflecting means.

As shown diagrammatically in FIGS. 1 and 2, the apparatus includes a supply or source of treating liquid 10 under pressure in a manifold or chamber that supplies an orifice plate 12 having a plurality of jet orifices 14 extending in a "cross-machine" direction of the apparatus as shown in FIG. 2. Streams or jets of liquid 16 forced through the orifices 14 pass through electrostatic droplet charging means 18, 18, which selectively imparts to the liquid charges that are retained on the droplets as the streams break into discrete droplets.

The charging plates 18, 18 must be sufficiently extensive in length and have a dimension wide enough in the direction of jet flow to charge droplets regardless of the random points at which their break-off occurs. In prior art apparatus, the perturbations caused break-off to occur in a narrow zone, downstream of the orifices. Here, without regular or separate artificial or external perturbation, the point of break-off varies more widely. In order to assure that all late-to-break-off droplets are charged, the ribbonlike charging plates 18, 18 must provide a field that extends to the region of breakoff of such droplets. In practice, the ribbon-like charging plates should preferably have a dimension of about 100 d inches (100 d cm) in the direction of jet flow where d is the orifice diameter in inches or centimeters. Their width or dimension in the direction of droplet flow could range from a size greater than about 30 d to less than about 300 d. Charging voltages to charge plates 18,18 preferably range from about 50 to about 200 volts.

After charging, the droplets in flight then pass a deflecting ribbon or means 20 which directs the paths of the charged droplets toward a suitable gutter or collector 22. Uncharged drops proceed toward a receiving substrate 24 (e.g., a textile), which is supported by and may be conveyed in some predetermined manner by means not shown, relative to the apparatus, in the direction of arrow 26 (i.e., a longitudinal direction transverse to the "cross-machine" direction previously defined). The deflector ribbon or means 20 is preferably operated at voltages ranging from about 1000 to about 3000 volts.

Reference may be had to known ink jet devices for further details of structural elements suitable for use in such apparatus.

In part, the structure of the present invention differs from the prior art in that the streams break up into droplets in response to a variety of factors including internal factors such as surface tension, internal acoustic motion, and thermal motion, rather than regular external perturbation. No regular varicosity inducing means are utilized, in contrast to what has heretofore been believed essential. Droplet formation takes place randomly.

Lord Rayleigh explored the dynamics of fluid jets around the beginning of the 20th century. He found that a fluid stream issuing under pressure from a jet orifice breaks into individual droplets at droplet-to-droplet intervals that statistically average $2\pi r$, where r is the radius of the orifice producing the jet. The droplet diameters average about 2.11 d. However, these spacings and sizes are only averages. Actual break-up is a random process; the actual droplet size and spacings vary. The actual sizes and spacings follow normal distribution curves around the means defined by the Rayleigh formulae and in experiments since Lord Rayleigh's work I have found that the average spacing is now better represented by the expression 4.51 d with 4.51 being an observed or measured number. For example, in apparatus having an ink pressure P of 12 psig and an orifice diameter of 0.002" (0.0051 cm) the mean droplet size is about 0.004" (0.0102 cm). The normalized standard deviation of the droplet sizes (that is, the standard deviation of droplet size, divided by the mean droplet size) is about 0.1; that is, 68% of the droplets are within 0.0004" (0.0010 cm) of the mean droplet size of 0.004" (0.0102 cm). Further, the break-off point varies from jet to jet by up to six drop spacings. These variances are too wide for utility in many applications. When intending to print a horizontal line across a substrate, all jets are commanded to print at the same time by removing voltage from the charge plate at all jet positions. It can be seen that if all jets break up into droplets at the same time and at the same distance from the orifice plate, the system will simultaneously cause all jets to start issuing uncharged drops and these drops will proceed to the substrate in step.

For the normalized standard deviation of droplet size of approximately 0.1, as is encountered in practice, this corresponds to about a 32% chance the droplet will be larger or smaller by that amount and the spot size on the substrate will correspondingly vary. This produces variation in the apparent uniformity of a horizontal line. This effect will be minor, however, in that for a deviation of 0.1 with a droplet of 0.004" (0.0102 cm) in diameter, the variation will only be 0.001" (0.0025 cm).

In flight from the point of break-off, larger drops have more mass than smaller drops, in proportion to the third power of the ratio of their diameters. The fluid dynamic force from passage through air that tends to slow them down is proportional to the square of the ratio of their diameters so that larger drops tend to maintain faster speeds in traveling to the substrate. Assuming, however, that all jets break off at the same time, for an orifice diameter of 0.003" (0.0076 cm), a distance to the substrate of one inch, a jet velocity of 400 inches per second (1000 cm/second) and a deviaton of 0.1 inch (0.254 cm) drop diameter, the misregistration on the substrate is less than two thousandths of an inch (0.0051 cm).

In the event one jet breaks off closer to the orifice plate than the mean break-off point of all jets by some number n of mean drop spacings (half the total spread) the resulting droplet (which I shall call the "late droplet") will have a farther distance to travel to the substrate than a droplet from the mean breakoff point (which I shall call the "mean droplet"). To date, the total spread of drop spacings I have noticed is about 6 or +3 and −3 about the mean. However, drop spacings can vary from this, for example, from about 2 to about 8 but will generally be greater than about 1. If V is the jet velocity in inches per second (or cm/second), d the orifice diameter in inches (or cm), and V' the rate of movement of the substrate in inches per second (or cm/second) the arrival of the late droplet at the substrate will occur about n (4.51 d/V) seconds after the arrival of the mean droplet. During this time interval the moving substrate will have traveled a distance of n (4.51 d) V'/V inches (or cm). By way of example, at a substrate speed of 60 inches per second (152.4 cm/second) (corresponding to a substrate moving at 100 yards per minute), a jet velocity of 800 inches per second (2032 cm/second), an orifice diameter of 0.003 inches (0.0076 cm), and with n=6, the misregistration error is 0.0061 inches (0.0155 cm). It is to be noted that if d were $2\sqrt{2}$ times larger and V twice smaller, the error would be $2\sqrt{2}$ larger, or about 0.017 inches (0.0432 cm). Thus, the use of the smaller diameter orifice and the higher pressure fluid in an unstimulated system can achieve smaller misregistration errors than a might initially be expected as compared to a regular periodically perturbed system of conventional orifice diameter and pressure.

In devices heretofore available, regular periodic stimulation or perturbation means have been required to narrow the distribution in drop size to essentially zero, to achieve acceptable misregistration error. However, I have found that errors due to the distribution of drop sizes can be substantially reduced by certain conditions. This can be seen from the following analysis. The normalized standard deviation of droplet size remains constant as the diameter of the orifice is made smaller and also as the pressure P is increased, in the absence of perturbing means. If the orifice diameter is reduced by, say, K(e.g. a factor of the square root of two ($\sqrt{2}$)), the area of the orifice is accordingly decreased by a $K^2$(e.g. a factor of two). If, however, at the same time stream velocity is increased by a factor of $K^2$(e.g. two) the net flow from the orifice remains constant.

For similar charge and deflection fields the drop trajectories will remain constant, but the natural frequency now is $K^3$ (e.g. $2\sqrt{2}$) higher and there are therefore now $K^3$(e.g. $2\sqrt{2}$) as many drops formed per unit time, and the time of flight to the substrate for any given drop is reduced to $1/K^2$ (e.g. halved). If the breakup point with a full sized jet varied over six drop spaces due to the random nature of break-up, as is often the case, a print error would occur of six times the break-off time interval times the speed of the substrate. With the smaller, higher pressure jet, the same error in break-off distance would result in an error only $1/K^3$(e.g. $1/2\sqrt{2}$) as great, (e.g. that is, 2.12 in this example instead of six or only 35% of the error above. Furthermore, fluctuations in density would now be averaged over $K^3$(e.g) $2\sqrt{2}$ drops; (e.g. if ther is a 32% chance that the drop radius for the larger orifice case varied 10%, with a corresponding volume variation of 33%, there would only be a 9% chance the smaller orifice system would so vary).

Though a regularly stimulated system can in principle be designed to deliver with high accuracy, in practice errors occur of up to two drop spacings. With an unstimulated system, the break-off point can vary over six to seven drop spacings, but by reducing orifice size and increasing pressure, this error can be reduced to that of a stimulated system with the larger orifice size, while still offering the advantage of substantially unlimited orifice plate length.

In general for this purpose, the orifice size may be in the range of 0.00035 to 0.020 inches (0.0008 to 0.05 cm) and the fluid or liquid pressure may be in the range of 2 to 500 psig (0.14 to 35 kg/cm$^2$). The value of droplet misregistration error can be less than about 0.1 inch (0.254 cm) for applications on substrates having a relatively smooth surface while for application to substrates having relatively unsmooth, rough or fibrous surfaces the droplet misregistration error can be less than about 0.4 inches (1.016 cm), or even 0.9 inches (2.3 cm) where such misregistration could be acceptable, such as where the printing or image will only be viewed from a distance.

More specifically I have found that general applications of a liquid to treat a substrate require an orifice diameter of about 0.004 inches (0.0102 cm) with the center to center spacing of orifices being about 0.016 inches (0.0406 cm). The liquid head pressures behind the orifices can vary from about 2 to about 30 psig (0.14 to 2.1 kg/cm$^2$). However, the preferred pressure range varies from about 3 to about 7 psig (0.2 to 0.5 kg/cm$^2$). The substrate can move at a velocity (V') of about 0 to about 480 inches per second (1300 cm/sec) with a preferred narrower range varying from about 5 to about 150 inches per second (12 to 380 cm/sec) and the most preferred rate being about 60 inches per second (152.4 cm/sec or 100 yards per minute).

More general ranges for the parameters involved, including the orifice and pressure ranges, are a jet velocity (V) ranging from about 200 to about 3200 inches per second (500 to 8200 cm/sec) with the more preferred velocity range varying from about 200 to about 500 inches per second (500 to 1300 cm/sec) for a general purpose liquid applicator and the most preferred jet velocity being about 400 inches per second (1000 cm/sec). Also, in certain instances substrates might be moved at rates faster than 480 inches per second (1300 cm/sec) and this apparatus could have applicability to printing at such substrate feed rates.

Fine printing, coloring, and/or imaging of substrates similar to the results obtainable from a perturbed system can be obtained with the present invention by using an orifice having a diameter of about 0.0013 inches (0.0033 cm) with appropriate center to center spacing. The pressures will be greater than in the general application circumstances above and will range from about 15 to about 70 psig (1 to 5 kg/cm$^2$), with the preferred pressure being about 30 psig (2 kg/cm$^2$). Here, jet velocities will preferably vary from about 600 to about 1000 inches per second (1500–2500 cm/sec) with the preferred velocity being about 800 inches per second (2000 cm/sec).

The viscosities of the ink, colorant or treating liquid are limited only by the characteristics of the particular treating liquid or coloring medium relative to the orifice dimension. From a practical standpoint, the liquid or medium will generally have a viscosity less than about 100 cps and preferably about 1 to about 25 cps.

Since the present invention can produce applicators of virtually almost any orifice plate length, as discussed previously, the range of application, unlike the previously discussed perturbed systems, is extremely broad. This is because the jet orifices can not only be constructed in very short lengths, such as a few centimeters or inches, they can also extend for any desired distance for example, 0.1 inch to 15 feet (0.254 to 460 cm) or longer. Accordingly, the present invention is uniquely suitable for use with wide webs or where relatively large surfaces are to be colored or printed with indicia of some type. One example is printing, coloring or otherwise placing images on textiles but it should be clearly understood this is not the only application of this invention. In a similar manner the characteristics of the receiving substrate can vary markedly.

In textile applications all textile dyes and dyestuffs and colorants can be used, being either natural or synthetic, so long as they are compatible with the material from which the orifice plate is constructed, such as stainless steel or other chemically resistant materials or combinations thereof, and are compatible as well with the orifice dimensions which are desired to be used. (Large particle materials can cause unwanted clogging.) Suitable textile dyes include reactive, vat, disperse, direct, acid, basic, alizarine, azoic, naphthol, pigment and sulphur dyes. Included among suitable colorants are inks, tints, vegetable dyes, lakes, mordants and mineral colors.

Included among the types of treating liquids are any desired printing, coloring or image forming agents or mediums, including fixatives, dispersants, salts, reductants, oxidants, bleaches, resists, fluorescent brighteners and gums as well as any other known chemical finishing agents such as various resins and reactants and components thereof, in addition to numerous additives and modifying agents. It is believed that all such materials could be effectively employed according to the present invention to produce desired effects on a variety of substrates, as for example, all types of paper and paper like products, cloth and textile webs of various woven, knitted, needled, tufted, felted, batt, spun-bonded and other non-woven types, metal sheet, plastics, glass, gypsum and similar composition board, various laminates including plywood, veneers, chipboard, various fiber and resin composites like Masonite, or any other material as well as on a variety of surfaces including flat, curved, smooth, roughened, or various other forms.

Figure 3:
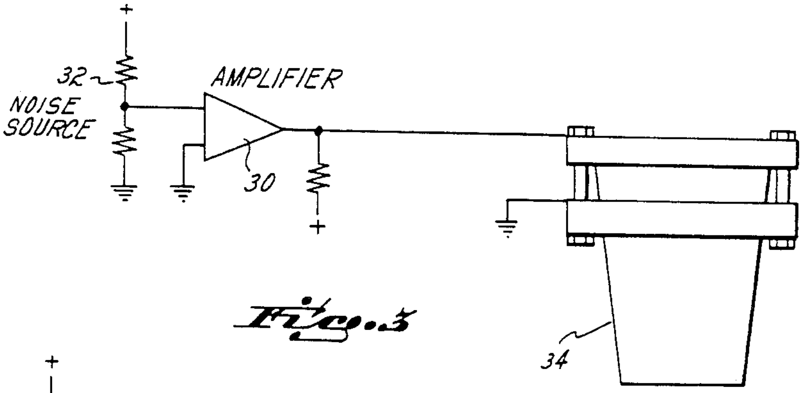
FIG. 3 is a schematic illustration of a modified embodiment of the invention wherein the apparatus is stimulated by a random noise generator that drives an acoustic horn.
Figure 4:
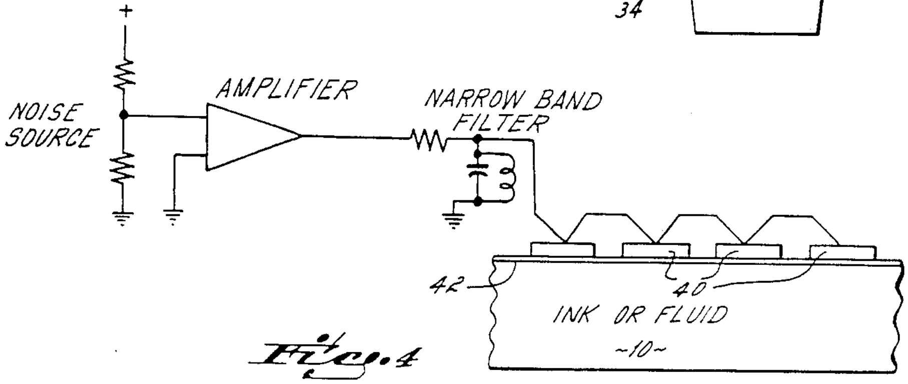
FIG. 4 is a diagrammatic illustration of another embodiment of a random noise perturbed system in accordance with the invention, wherein a series of piezoelectric crystals apply random noise perturbations to a wall of the fluid or liquid supply manifold or chamber.

The apparatus shown in FIGS. 1 and 2 is unperturbed. As previously mentioned, background or other vibrations in the area of use can themselves sometimes act as perturbation means and produce undesirable variable results. FIGS. 3 and 4 show a modified embodiment of the apparatus, wherein the system is not regularly perturbed, but is subject to irregular or noise perturbation, which overrides or masks such background vibration.

In FIG. 3 the noise source includes an amplifier 30 which applies noise from a resistive or other electrical source 32, to a transducer such as an acoustic horn 34. The horn imparts the noise vibrations to the fluid or the manifold. These random perturbations may be applied to the fluid using prior art transducers; but the perturbation they apply herein is irregular, not regular.

In FIG. 4, the noise transducer is a set of piezoelectric crystals 40 which are mounted to wall 42 of the fluid manifold 12. Other types of transducers may be used, as known in the art. The difference is that they are operated in a narrow band of random frequencies, not at regular frequencies.

It is desirable that the central frequency of the noise approximate the natural frequency of droplet breakup. This is about V/4.51 d cycles per second where d is the jet diameter in inches or cm and V the velocity of the jet in inches per second. The band width is desirably less than about 12,000 cycles/second, so that the random vibrations are most effective in achieving breakoff.

While the invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims, which scope is to be accorded the broadest interpretation so as to encompass all such modifications and equivalent structures.

What I claim is:

1. Apparatus for randomly generating liquid droplets and for selectively applying such liquid droplets to a moving substrate surface, said apparatus comprising:

a source of pressurized liquid;

an array of spaced apart liquid jet orifices extending in a cross-machine direction transverse to the direction of movement of said substrate surface, each of said orifices being in fluid communication with said source of pressurized fluid;

random signal generation means including a random signal generator driving an electro-acoustic transducer acoustically coupled to said liquid for actively inducing random drop formation processes in fluid streams issuing from said orifices in a manner substantially independent of the cross-machine dimension by substantially avoiding stationary standing acoustic waves or other phenomena associated with regular periodic perturbations that would, if regular periodic perturbations were used, limit the maximum cross-machine dimension;

charging electrode means disposed downstream of said orifices and extending over the zone of random drop formation for selectively imparting electrical charges to said drops as they are randomly formed; and deflection electrode means disposed downstream of said charging electrode means for deflecting electrically charged droplets away from the substrate surface.

2. Apparatus as in claim 1 wherein said random signal generation means generates and utilizes noise signals only within a predetermined range of frequencies.

3. Method for randomly generating liquid droplets and for selectively applying such liquid droplets to a moving substrate surface, said method comprising:

pressurizing a source of liquid;

feeding said pressurized liquid to an array of spaced apart liquid jet orifices extending in a cross-machine direction transverse to the direction of movement of said substrate surface;

generating random electrical signals;

driving an electro-acoustic transducer with said random electrical signals;

acoustically coupling random perturbations from said transducer to said liquid to actively induce random drop formation processes in fluid streams issuing from said orifices in a manner substantially independent of the cross-machine dimension by substantially avoiding stationary standing acoustic waves or other phenomena associated with regular periodic perturbations that would, if regular periodic perturbations were used, limit the maximum cross-machine dimension;

selectively activating a charging electrode means disposed downstream of said orifices and extending over the zone of random drop formation to impart electrical charges to said drops as they pass thereby; and deflecting electrically charged droplets away from the substrate surface downstream of said charging step.

4. Method as in claim 3 wherein said acoustic coupling step utilizes noise signals only within a predetermined range of frequencies.

5. Apparatus as in claim 1 or 2 wherein said random signal generation means comprises:

a noise source providing electrical noise signals at an output;

a selective bandpass filter connected to receive said electrical noise signals from the noise source output and to pass therethrough to a filtered output only the portion of such signals occurring within predetermined band of frequencies; and an electro-acoustic transducer connected to receive said filtered output signals and to convert same to corresponding mechanical vibrations.

6. Apparatus as in claim 5 wherein said selective bandpass filter includes means limiting said predetermined band of frequencies to a bandwidth of less than about 12,000 cycles/second.

7. Method as in claim 3 or 4 wherein said random perturbations are generated by bandpass filtering electrical noise signals and by converting the resultant filtered electrical signals to corresponding mechanical vibrations.

8. Method as in claim 7 wherein said bandpass filtering includes limiting the bandwidth of filtered electrical signals to less than about 12,000 cycles/second.

9. Method as in claim 3 or 4 wherein said substrate comprises a continuous length textile material moving transverse to said cross-machine direction.

10. Method as in claim 7 wherein said substrate comprises a continuous length textile material moving transverse to said cross-machine direction.

11. Method as in claim 8 wherein said substrate comprises a continuous length textile material moving transverse to said cross-machine direction.

12. In a liquid jet printing apparatus where droplets of pressurized liquid issuing from an array of orifices are selectively controlled to pass or not to pass onto a substrate surface, the orifice array extending in a cross-machine direction transverse to movement of the substrate therepast, the improvement comprising:

random perturbation means including a random signal generator driving an electro-acoustic transducer coupled to said liquid for artificially inducing random drop formation processes in streams of fluid issuing from said orifices in a manner substantially independent of the cross-machine dimension by substantially avoiding stationary standing acoustic waves or other phenomena associated with regular periodic perturbations that would, if regular periodic perturbations were used, limit the maximum cross-machine dimension.

* * * * *

UNITED STATES PATENT AND TRADEMARK OFFICE

CERTIFICATE OF CORRECTION

PATENT NO. : 4,523,202

DATED : June 11, 1985

INVENTOR(S) : Rodger L. Gamblin

It is certified that error appears in the above-identified patent and that said Letters Patent is hereby corrected as shown below:

Column 4, line 25, change "measured" to --drawn--.

Column 6, line 56, change "deviaton" to --deviation--.

Column 7, line 21, delete "a";

line 37, before "$K^2$, delete "a";

line 46, change "to" to --by--; and lines 56-7, change "(e.g.) $2\sqrt{2}$", to --(e.g. $2\sqrt{2}$)--;

Column 8, line 43, before "perturbed", insert --regularly--; and line 64, before "perturbed", insert --regularly--.

Signed and Sealed this

*Fourth* Day of *February 1986*

[SEAL]

*Attest:*

DONALD J. QUIGG

*Attesting Officer* *Commissioner of Patents and Trademarks*